United States Patent
Barum

(10) Patent No.: US 8,588,103 B2
(45) Date of Patent: Nov. 19, 2013

(54) SYSTEM AND METHOD FOR DISTRIBUTING COMMUNICATIONS THROUGH A DENSE MESH NETWORK

(75) Inventor: Walter Barum, Salt Lake City, UT (US)

(73) Assignee: Control4 Corporation, Salt Lake City, UT (US)

( * ) Notice: Subject to any disclaimer, the term of this patent is extended or adjusted under 35 U.S.C. 154(b) by 859 days.

(21) Appl. No.: 12/100,997

(22) Filed: Apr. 10, 2008

(65) Prior Publication Data

US 2008/0253386 A1 Oct. 16, 2008

Related U.S. Application Data

(60) Provisional application No. 60/911,042, filed on Apr. 10, 2007.

(51) Int. Cl.
*H04L 12/28* (2006.01)

(52) U.S. Cl.
USPC ........... 370/254; 370/318; 370/406; 370/425; 455/63.1

(58) Field of Classification Search
None
See application file for complete search history.

(56) References Cited

U.S. PATENT DOCUMENTS

| | | | |
|---|---|---|---|
| 3,878,377 A | 4/1975 | Brunone | |
| 3,909,826 A | 9/1975 | Schildmeier et al. | |
| 4,040,060 A | 8/1977 | Kaloi | |
| 4,068,289 A | 1/1978 | Ferrigno | |
| 4,138,684 A | 2/1979 | Kerr | |
| 4,163,218 A | 7/1979 | Wu | |
| 4,186,381 A | 1/1980 | Fleischer et al. | |
| 4,222,564 A | 9/1980 | Allen et al. | |
| 4,322,842 A | 3/1982 | Martinez | |
| 4,334,171 A | 6/1982 | Parman et al. | |
| 4,393,277 A | 7/1983 | Besen et al. | |
| 4,418,333 A | 11/1983 | Schwarzbach et al. | |
| 4,511,887 A | 4/1985 | Fiore | |
| 4,524,288 A | 6/1985 | Schimmelpennink et al. | |
| 4,527,247 A | 7/1985 | Kaiser et al. | |
| 4,636,791 A | 1/1987 | Burke et al. | |
| 4,644,320 A | 2/1987 | Carr et al. | |
| 4,703,306 A | 10/1987 | Barrit | |
| 4,706,274 A | 11/1987 | Baker et al. | |

(Continued)

FOREIGN PATENT DOCUMENTS

| | | |
|---|---|---|
| EP | 0 513 688 | 11/1992 |
| EP | 0 513 443 | 11/1995 |

OTHER PUBLICATIONS

Parekh, Abhay K., "Selecting routers in ad hoc wireless networks." In: Proceedings of the SBT/IEEE International Telecommunication Symposium, ITS, Aug. 1994.*
Depositon of Bill Nuffer, CPP, Apr. 30, 2005, pp. 1-49.

(Continued)

*Primary Examiner* — Andrew Chriss
*Assistant Examiner* — Salvador E Rivas
(74) *Attorney, Agent, or Firm* — Austin Rapp & Hardman

(57) ABSTRACT

A system and method for distributing communications through a dense mesh network having a plurality of nodes coupled to one of at least two gateway controllers is disclosed. A node location of each node is calculated relative to other nodes in the mesh network. Nodes that are less than a predetermined distance of each other are assigned to separate gateway controllers. Radio frequency interference levels between the nodes in the mesh network are measured and channels or PN codes of nodes having interference levels greater than a predetermined amount are changed.

17 Claims, 2 Drawing Sheets

(56) References Cited

U.S. PATENT DOCUMENTS

| | | |
|---|---|---|
| 4,755,792 A | 7/1988 | Pezzolo et al. |
| 4,764,981 A | 8/1988 | Miyahara et al. |
| 4,768,218 A | 8/1988 | Yorita |
| 4,823,069 A | 4/1989 | Callahan et al. |
| 4,825,209 A | 4/1989 | Sasaki et al. |
| 4,829,554 A | 5/1989 | Barnes et al. |
| 4,864,588 A | 9/1989 | Simpson et al. |
| 4,873,711 A | 10/1989 | Roberts et al. |
| 4,881,259 A | 11/1989 | Scordato |
| 4,889,999 A | 12/1989 | Rowen |
| 4,896,370 A | 1/1990 | Kasparian et al. |
| 4,908,604 A | 3/1990 | Jacob |
| 4,918,432 A | 4/1990 | Pauley et al. |
| 4,918,717 A | 4/1990 | Bissonnette et al. |
| 4,928,778 A | 5/1990 | Tin |
| 4,939,792 A | 7/1990 | Urbish et al. |
| 4,940,964 A | 7/1990 | Dao |
| 4,977,529 A | 12/1990 | Gregg et al. |
| 4,996,703 A | 2/1991 | Gray |
| 5,017,837 A | 5/1991 | Hanna et al. |
| 5,051,720 A | 9/1991 | Kittirutsunetorn |
| 5,079,559 A | 1/1992 | Umetsu et al. |
| 5,086,385 A | 2/1992 | Launey et al. |
| 5,089,974 A | 2/1992 | Demeyer et al. |
| 5,099,193 A | 3/1992 | Moseley et al. |
| 5,109,222 A | 4/1992 | Welty |
| 5,146,153 A | 9/1992 | Luchaco et al. |
| 5,173,855 A | 12/1992 | Nielsen et al. |
| 5,191,265 A | 3/1993 | D'Aleo et al. |
| 5,218,344 A | 6/1993 | Ricketts |
| 5,218,628 A | 6/1993 | Ito |
| 5,224,648 A | 7/1993 | Simon et al. |
| 5,237,264 A | 8/1993 | Moseley et al. |
| 5,321,736 A | 6/1994 | Beasley |
| 5,348,078 A | 9/1994 | Dushane et al. |
| 5,359,625 A | 10/1994 | Vander Mey et al. |
| 5,382,947 A | 1/1995 | Thaler et al. |
| 5,386,209 A | 1/1995 | Thomas |
| 5,400,041 A | 3/1995 | Strickland |
| 5,400,246 A | 3/1995 | Wilson et al. |
| 5,412,654 A | 5/1995 | Perkins |
| 5,426,439 A | 6/1995 | Grossman |
| 5,455,464 A | 10/1995 | Gosling |
| 5,495,406 A | 2/1996 | Kushiro et al. |
| 5,530,322 A | 6/1996 | Ference et al. |
| 5,544,036 A | 8/1996 | Brown, Jr. et al. |
| 5,565,855 A | 10/1996 | Knibbe |
| 5,570,085 A | 10/1996 | Bertsch |
| 5,572,438 A | 11/1996 | Ehlers et al. |
| 5,574,748 A | 11/1996 | Vander Mey et al. |
| 5,598,039 A | 1/1997 | Weber |
| 5,602,839 A * | 2/1997 | Annapareddy et al. ....... 370/405 |
| 5,736,965 A | 4/1998 | Mosebrook et al. |
| 5,793,300 A | 8/1998 | Suman et al. |
| 5,798,581 A | 8/1998 | Keagy et al. |
| 5,905,442 A | 5/1999 | Mosebrook et al. |
| 5,982,103 A | 11/1999 | Mosebrook et al. |
| 6,304,556 B1 | 10/2001 | Haas |
| 6,687,487 B1 | 2/2004 | Mosebrook et al. |
| 6,754,192 B2 | 6/2004 | Kennedy |
| 6,803,728 B2 | 10/2004 | Balasubramaniam |
| 6,975,614 B2 | 12/2005 | Kennedy |
| 2003/0005147 A1* | 1/2003 | Enns et al. .................... 709/238 |
| 2004/0218582 A1* | 11/2004 | Kennedy et al. .............. 370/351 |
| 2005/0169214 A1* | 8/2005 | Suomela ....................... 370/331 |
| 2007/0070937 A1* | 3/2007 | Demirhan et al. ............ 370/328 |
| 2007/0127378 A1* | 6/2007 | Yang et al. ................... 370/235 |
| 2007/0239615 A1* | 10/2007 | Matsuzaki et al. ............. 705/55 |
| 2008/0192713 A1* | 8/2008 | Mighani et al. ............... 370/338 |

OTHER PUBLICATIONS

Anova Control Center, Operators Manual, pp. 1-50.

* cited by examiner

SYSTEM AND METHOD FOR DISTRIBUTING COMMUNICATIONS THROUGH A DENSE MESH NETWORK

CROSS-REFERENCE TO RELATED APPLICATIONS AND CLAIM OF PRIORITY

Priority of U.S. Provisional patent application Ser. No. 60/911,042 filed on Apr. 10, 2007 is claimed.

FIELD OF THE INVENTION

The present invention relates generally to the control of a mesh network.

BACKGROUND

Smart homes and buildings with automated controls for heating and air conditioning, lighting, audio visual entertainment, and similar devices have been predicted for decades. While various forays have been made into home and building automation, ubiquity in the market is still lacking. Some of the more prominent reasons for the lack of affordable automation devices are the expense of automation devices and the difficulty and labor needed for interconnecting the devices throughout a structure.

Proprietary wireless communication standards have rapidly developed over the last few decades. It is now common to see people communicating over wireless telephones and using the internet over wireless data links. The wireless revolution has enabled people to stay connected through the use of cell phones and wireless internet as never before. People can now use their telephones and computers throughout homes, schools, and offices without the need for expensive, built in wiring.

However, many of the wireless standards that have been developed are not congruent with the needs of an automation system. A truly automated home or building can involve controlling dozens of devices, including lights, switches, thermostats, security systems, audiovisual equipment, and so forth. Devices constructed using standards such as IEEE 802.11 are usually too expensive and power intensive to be effectively used to control the dozens of devices in a cost effective manor. Other wireless protocols such as the popular Bluetooth standard can also be too expensive, power intensive, and have a limited range.

To overcome these problems a new type of wireless system has been developed. Ad-hoc networks, also referred to as mesh network, use wireless protocols such as the IEEE 815.15.4 (Zigbee) standard. Mesh networks use a plurality of nodes, with each node being able to communicate to other neighboring nodes that are within range. Thus, each node can act as a repeater. This allows for wireless systems employing mesh networks to use inexpensive, lower power transceivers since each node only needs to broadcast as far as a neighboring node, which can then pass the data on to another node until the data reaches a controller or other destination connected to a wired system. These lower power, lower cost wireless systems enable economical automation systems to be installed in houses, buildings, and factories without the need for complex infrastructure upgrades. However, installation of a dense mesh network, with an adequate number of controls for the potentially dozens of automatable devices to be controlled within a building, can create complexities within the network that can reduce network operability and efficiency.

SUMMARY

A system and method for distributing communications through a dense mesh network having a plurality of nodes coupled to one of a plurality of gateway controllers is disclosed. A node location of each node is calculated relative to other nodes in the mesh network. Nodes that are less than a predetermined distance of each other are assigned to separate gateway controllers. Radio frequency interference levels between the nodes in the mesh network are measured. Nodes having interference levels greater than a predetermined amount are assigned to a different channel.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Figure 1:
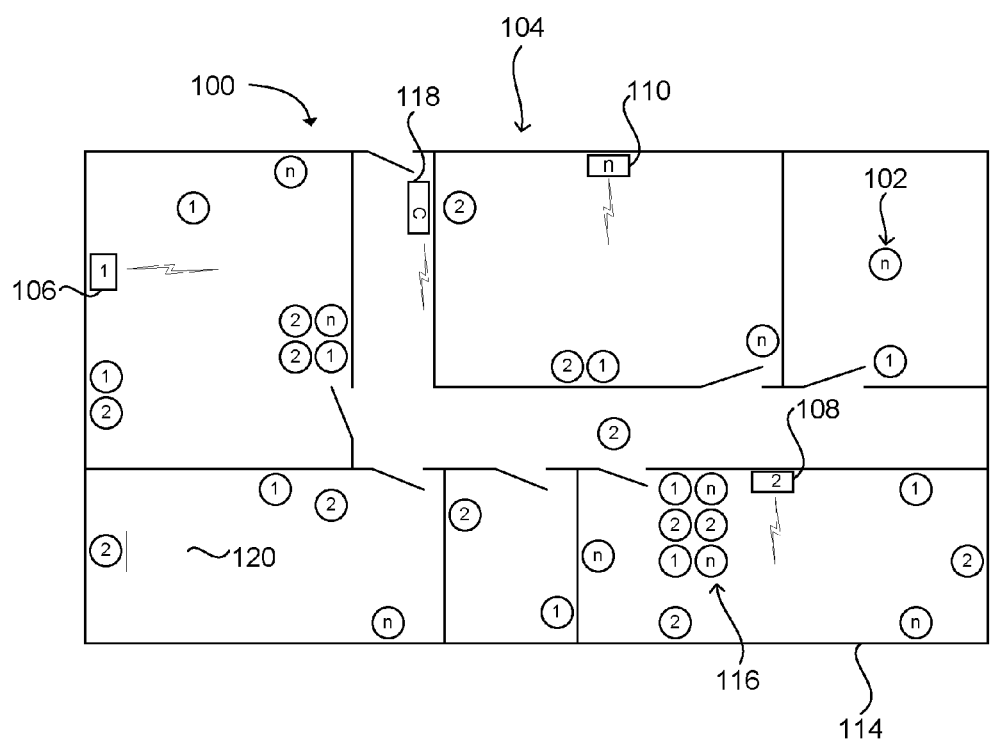
FIG. 1 is a diagram of a dense mesh network in accordance with an embodiment of the present invention.

As illustrated in FIG. 1, a dense mesh network 100 comprising a plurality of nodes 102 is shown. A dense mesh network is defined as a mesh network having three or more adjacent nodes close enough in proximity to cause unwanted interference among the adjacent nodes. The network is shown installed within a structure 104, such as a home, building, or factory. Each node in the mesh network typically acts as both a transmitter and a receiver. This enables each node to pass information from neighboring nodes. Mesh networks are typically spread apart so that the plurality of nodes will have minimal radio frequency interference with other nodes while still being close enough to maintain desired data rates as data is broadcast between the various nodes. However, in order to automate a desired infrastructure within a building, it is often necessary to install multiple nodes within a relatively short distance.

For example, rooms such as kitchens, family rooms, and home theater rooms in a house, or meeting rooms in an office or factory, can contain a number of different devices that a consumer would like to control. There can be nodes coupled to dimmers and mechanical switches used to control different lighting features, audio visual equipment, speakers, display screens, environmental controls, appliances, and the like. Each device that is to be controlled can be connected to a wireless mesh node. A dense mesh network can include hundreds of nodes throughout a house or building. Clusters of nodes can include from 3 to 30 or more nodes located close enough to one another that the nodes can cause an undesired amount of radio frequency interference among the other nodes. The actual amount of interference is dependent upon the type of wireless system used to communicate among the various nodes.

FIG. 1 shows a room 114, such as the home theater room in a house or a meeting room in an office or factory, that includes a cluster 116 of nodes located adjacent to each other. Each of the nodes can be coupled to a controllable device, such as an array of light dimmers or switches. The dimmers or switches can be located in a standard junction box. The dimmers or switches can be used to control various lighting schemes in the room and to lower and raise a display screen for audiovisual presentations. Each of the dimmers or switches can be automated by installing a switch coupled to a wireless mesh node system. The node can receive communication, for example, from a remote control, such as a table top or wall mounted touchpad 118. The touchpad can be used to remotely control various devices within a room or throughout the structure, such as the cluster 116 of nodes coupled to switches or other controllable devices, as well as the nodes coupled to assorted audiovisual and entertainment devices within the room.

In one embodiment, the touch pad can be located outside the theater room 114. In this case, the touch pad can transmit a relatively low power signal which can be received by any wireless node within range of the touchpad. A receiving node can then transmit the information to an adjacent node. The transmission between nodes can continue until the signal is sent to the desired switch in the cluster 116. The placement of the nodes in the cluster, however, can be problematic for sending and receiving wireless commands. For instance, the relatively close grouping of a plurality of wireless nodes can create problems with radio frequency interference and routing between the nodes in the group and throughout the structure. The complexities of using a wireless node network to automate electronic and mechanical devices throughout a structure containing one or more clusters of nodes are also significant.

A multi-pronged approach can be used to overcome the problems with interference and routing. In one embodiment, interference and routing problems can be reduced by reducing inter-node communication between each of the nodes. As previously discussed, many types of mesh networks are constructed with substantially evenly spaced nodes to optimize the nodes broadcasting capabilities. However, it is often not possible to geographically separate the nodes when automating devices within a structure. Automatable devices in a home or building, such as light switches for a room, are typically located adjacent one another to enable physical control of electronic devices within the room to be more convenient. One solution can be to electronically separate nodes that produce or receive a predetermined amount of radio frequency interference. Electronic separation can be accomplished using a variety of techniques.

One way of reducing interference is to assign the plurality of nodes 102 within the structure 104 to two or more communication paths. A communication path is an electronic path that enables an electronic signal to be capable of being electronically distinguished from other electronic signals. Several ways for varying electronic paths include different channels, different signal phase, different signal timing, different signal codes, and so forth.

For example, the six nodes in the cluster 116 can be configured to be assigned to N different channels. Assigning each of the nodes to different channels can reduce or substantially eliminate radio frequency interference between the nodes in the group. In one embodiment, a gateway controller 110 can be implemented within the mesh network 100 for each desired channel. Thus, if three channels are desired to reduce interference, three different gateway controllers can be used. Alternatively, a gateway controller can be configured to receive data from two or more channels, enabling a single gateway controller to be used to transmit and receive data over multiple channels to a plurality of nodes throughout the structure.

FIG. 1 shows a first gateway controller 106, a second gateway controller 108, and an Nth gateway controller 110. In this example embodiment, each of the gateway controllers has been assigned to a plurality of the nodes within the structure 104. This is shown by placing the number of the gateway controller within the node that it is assigned to. In practice, the channel or gateway controller to which a node is assigned can be dynamically changed to optimize data transmission through the mesh network.

Assigning the nodes to multiple channels can reduce the amount of radio frequency interference present in a constrained area such as the cluster 116 of nodes. However, it may not be feasible to have every node within the cluster transmit and receive on a unique channel.

An alternative technique for reducing interference between the nodes is to use spread spectrum encoding between each node and gateway controller. In a spread spectrum system a signal is typically spread by modulating a pseudorandom code (PN code) onto the signal. The length and speed (referred to as the chip rate) of the PN code is proportional to how much the data signal is spread. The power of the signal within the previous bandwidth of the data signal is decreased relative to the amount of spreading. Thus, a PN code that is three times the data rate can reduce the overall power by approximately three times. A high enough chip rate can actually reduce the power of a transmitted signal below the noise floor. A receiver node can then modulate the received spread signal with the same PN code and the same timing as the PN code was modulated onto the transmitted signal. This removes the PN code and effectively despreads the signal, increasing the received power by the same ratio it was decreased when spread.

Applying a unique PN code to each node in the group of switches 116 enables spread spectrum signals to be transmitted to an individual node within the group. The spread spectrum signal can contain substantially less power than a non-spread signal. This can reduce interference between the nodes when a signal is transmitted to a particular node or group of nodes. Thus, rather than requiring N different gateway controllers, a single gateway controller may transmit N orthogonal, substantially non-interfering spread spectrum signals using N orthogonal PN codes. Alternatively, two or more gateway controllers could each have unique PN codes assigned to enable them to each communicate with a plurality of nodes. The plurality of nodes can be differentiated by the PN code or codes they are configured to receive. The nodes can be dynamically configured and assigned different PN codes based on the desired dynamics of the overall system.

Of course there are limitations to the number of different channels or PN codes that can be used to differentiate the nodes. As previously discussed, ad-hoc, or mesh networks operate by broadcasting low power signals that can be received and re-broadcast by neighboring nodes. The amount a mesh network can be differentiated into a plurality of different channels or codes is limited by at least the placement, transceiver power output, and sensitivity of the nodes. Because of the low power signals sent, each node 102, as shown in FIG. 1, typically requires a fairly unobstructed pathway through neighboring nodes to its assigned gateway controller. Thus, there are constraints in assigning channels or codes to the nodes within the network.

For example, in the theater room 114 the nodes in the cluster 116 can be assigned to channels or codes 1, 2, and N. Other nodes within that room, and surrounding rooms, can also be assigned to these channels or codes. The network can be configured to enable each of the nodes to effectively communicate with a node controller. However, changes can occur in the network, such as when the touchpad controller 118 is moved into the theater 114 or when a person or object 120, such as a metal book case, is moved between the path of a node and its nearest neighbor, causing substantial attenuation of the signal. The network can be dynamically reconfigured to allow the network to continue to operate as mobile devices containing nodes 102 are moved about the structure 104.

In one embodiment, the dynamic configuration of the mesh network can be accomplished through a series of steps. One step can enable each gateway controller to "discover" all of the devices on the mesh network. This can be accomplished by pinging each node, or sending out a broadcast message to ask mesh nodes to send one or more packets back to the gateway. Responding nodes can be added to a table containing available nodes on the network.

Each gateway controller 110 can gather a list of metrics from each node 102 to evaluate the mesh network connectivity between the gateway and each node. One metric to evaluate the connectivity is the number of hops to and/or from the gateway (i.e. the number of nodes the message or packet is passed through). Another metric is a level of radio signal strength of the node. The radio signal strength may be measured between the gateway and the node, or between the node and its nearest neighboring node. Other information that can be collected includes the addresses of mesh network neighbors of each node, which nodes are capable of routing messages, which nodes can roam from current locations to other locations, which nodes are fixed in one location, the data rate that each node is transmitting at, how much of that bandwidth is available for use, the average amount of bandwidth that is used, and so forth. This information can be collected and stored for use as metrics to optimize the overall performance of the mesh network 100.

Network tests can be actively performed on each node 102 to gather further information. For example, each node can be pinged and a score can be assigned based on its delivery success and response time. The tests can be performed on the network during periods of low use. If the network has changed since the last test was run then metrics can be used to update and substantially optimize the overall network in its new configuration.

If a node no longer responds when it is pinged then a search can be performed. For example, as previously stated, a person or object may break a radio link between a node and its neighbor. If another neighboring node on that same channel or code is not available to communicate with, the node may become orphaned, unable to communicate with its gateway controller or neighbors. The node can be configured to change to a different channel or code to enable the orphaned node to communicate with different node neighbors or gateway controllers. Alternatively, the node may be "dumb", unable to correct itself In that case, when a gateway controller can no longer communicate with a node it may send out messages at different codes or frequencies, or communicate with other gateway controllers and ask them to attempt to locate the orphaned node.

A further dynamic configuration embodiment includes comparing node lists of each gateway and using the gathered metrics to determine which nodes should be assigned to which gateways. Algorithms include, but are not limited to, evenly distributing the nodes according to how many nodes and how many gateways exist in the overall mesh network 100. Alternatively, each node can be allocated to the gateway that is the closest based on the number of mesh network hops to the gateway. Additionally, each node can be allocated to a gateway based on a ping test response to that gateway. The ping test can be assigned a score based on response time, output power and received power between the node and the gateway, and the number of hops over which the ping occurred. The node can be assigned to the gateway controller to which it scored the highest.

The nodes 102 can be additionally assigned in a dynamic configuration using the metrics listed above. However, more complex issues are typically present in a dense mesh network, such as the cluster 116 of nodes that were previously discussed. Interference between the nodes can be measured and added to the list of metrics. Nodes having high interference can be reassigned to another gateway controller 110 on another channel. Nodes will typically have the highest interference based on their close location to another node, such as nodes in the cluster. In one embodiment, a node reporting substantial interference can be reassigned to another gateway based on metrics such as the ping test described above. If the node has metrics sufficient to operate with another gateway then it can be reassigned. If not, then a neighboring node, such as a node that may be causing the interference, can be reassigned. After each node is reassigned then the metrics can be updated and reviewed to determine how the reassignment affected neighboring nodes and the overall mesh network 100.

After the nodes 102 have been reassigned based on interference then additional dynamic changes may be needed. For example, if nodes in the group of nodes 116 still have substantial interference after being assigned to alternative gateway controllers 110, further measures can be taken to reduce interference to an acceptable level. In one embodiment the output power of one or more nodes can be reduced. Reducing the output power of the node will reduce the nodes number of neighbors. But in an area where the neighbors are closely located, it may be beneficial to reduce the output power of a node to reduce or eliminate interference with another node on the same channel. In one embodiment, all but one of the nodes in the group can be instructed to attenuate their radios in order to isolate them to an island within the mesh network, which can reduce the network density. This is equivalent to dynamically changing a portion of the mesh network into a star-cluster network.

Alternatively, the nodes in a cluster can be assigned to two or more channels or codes. However, in a large cluster, there may still be multiple nodes of the same channel, as in the cluster 116 of nodes in FIG. 1, which is divided among three channels or codes, but still includes two nodes assigned to each gateway controller. In this instance, all of the nodes but one for each channel can be instructed to attenuate their radios. This enables the cluster to still receive at each node and provides a transmitter for each channel while minimizing interference between the adjacent channels. Thus, the bandwidth of the node is increased by using a plurality of channels or codes.

Further analysis of the metrics can be used to reveal if there are any bottlenecks in the mesh. For example, analysis can be used to determine if multiple nodes frequently use the same mesh node as a routing hop. The overuse of a single node can bandwidth limit the overall network if a particular node is receiving and transmitting at its maximum capability while neighboring nodes are using only limited resources. By comparing metrics comprising neighbor tables of nearby nodes, a gateway can configure selected nodes not to use a neighbor that would otherwise be assigned, but to use an acceptable alternative instead.

Additional time based analysis of the mesh network's behavior can be used to reveal traffic patterns of node behavior, such as which nodes generate a lot of traffic themselves and therefore do not make a good routing node, and which nodes are relatively quiet and are good candidates to be routers. For example, a node coupled to a thermostat may be substantially busy sending and receiving data from various detectors throughout an automated structure 104. However, a node coupled to a light switch may be used much less frequently, only when lights are activated in a certain room. Thus, a time based analysis of the mesh network's behavior enables a gateway controller or some other controller to rearrange the traffic of a mesh network based on the degree of activity of a node.

Further analysis of time based metrics can be used to gather statistics on transmission and reception success of nodes. Nodes that have a significant failure rate can be assigned to another gateway controller. Alternatively, a node neighbor may be reassigned to a same channel as a node having a significant failure rate to enable a communication pathway with a lower failure rate.

Active testing of the mesh network 100 can be carried out during periods of low network activity to dynamically adjust the portioning and provisioning of the network as needed.

Figure 2:
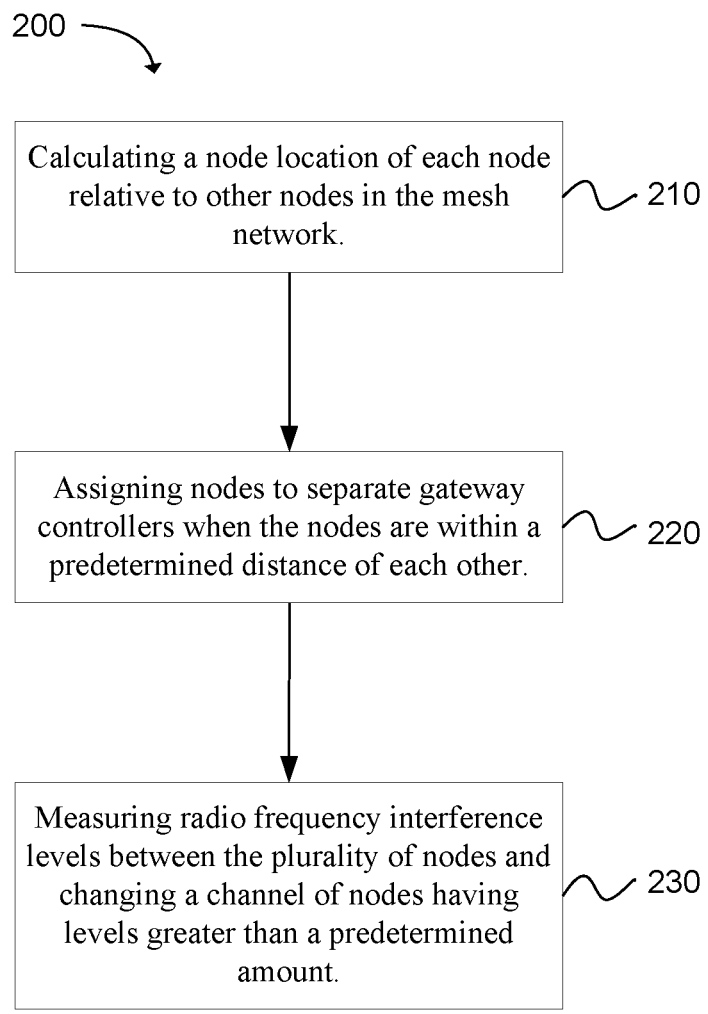
FIG. 2 is a flow chart depicting a method for distributing communications through a dense mesh network having a plurality of nodes coupled to one of a plurality of gateway controllers in accordance with an embodiment of the invention.

Another embodiment of the invention provides a method 200 for distributing communications through a dense mesh network having a plurality of nodes coupled to one of at least two gateway controllers, as depicted in the flow chart of FIG. 2. The method includes the operation of calculating a node location of each node relative to other nodes in the mesh network, as shown in block 210. Calculating a node location of each node relative to the other nodes can be accomplished in a variety of ways. The technique used can depend on the reason for which the information is obtained.

The relative node location of each node can be determined by the time it takes for each node to respond to a ping sent from a gateway controller. The response time is dependent on a distance of each node from the controller. However, several other variables can also contribute to the timeliness of the response, such as interference, noise, power output, and the like. Therefore, other methods to determine a location of each node can include, but are not limited to, measuring a power of a received signal from each node. Each node can also report the neighbors with which it communicates. Nodes having the same or similar neighbors are likely to be located close to each other. A map of the neighboring nodes can be generated based on this information and the information from the map, combined with the timing information from pinging and power levels of the nodes, can be used to approximate the relative location of the nodes. This information can be stored and saved as metrics that can be used to optimize the performance of the overall mesh network.

The method further includes the operation of assigning nodes to separate gateway controllers when the nodes are within a predetermined distance of each other, as shown in block 220. When nodes are within a predetermined distance it can cause unwanted radio frequency interference. The interference can reduce the response time and bandwidth of the overall mesh network. The actual distance that causes unwanted interference is dependent upon the specifications of the wireless mesh network, such as receiver sensitivity, transmitter power output, and so forth. The actual distance at which nodes are separated before an undesired level of radio frequency interference occurs can be from less than an inch to tens of feet of separation distance between nodes. Assigning adjacent nodes, where possible, to separate gateway controllers, and therefore separate communication pathways, can substantially reduce the amount of interference between the separate nodes.

Due to the large number of nodes in a relatively small space within a structure, it is possible that there is still greater than desired radio frequency interference between the nodes that comprise the mesh network. An additional operation involves measuring radio frequency interference levels between the plurality of nodes and changing a channel of nodes having levels greater than a predetermined amount, as shown in block 230.

It is also possible that there are groups of nodes that have a greater number of nodes within a predetermined distance than there are gateway controllers. Thus, it may not be possible to assign every node that is within a predetermined distance to another node to separate gateway controllers. One solution to minimize radio frequency interference between nodes that cannot be reassigned to separate channels is to attenuate the transmitter output power of one or more nodes within the network.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for distributing communications through a dense mesh network having a plurality of nodes coupled to one of a plurality of gateway controllers, comprising:
   calculating a node location of each node relative to other nodes in the mesh network;
   assigning nodes to separate gateway controllers when the nodes are within a predetermined distance of each other;
   measuring radio frequency interference levels between the plurality of nodes and changing a communication path of nodes having levels greater than a predetermined amount;
   and
   dynamically changing a portion of the mesh network into a star-cluster network by instructing all but one node in a cluster of nodes to attenuate output power of the all but one node in order to minimize interference between adjacent nodes in the cluster of nodes, wherein dynamically changing the portion of the mesh network into a star-cluster network is based on an interference measurement.

2. A method as in claim 1, wherein calculating a node location further comprises pinging each node to determine a ping time to send and receive a signal between one of the gateway controllers and each node.

3. A method as in claim 2, wherein assigning nodes to separate gateway controllers further comprises assigning a node of the plurality of nodes to a different gateway controller when the ping time between the node and the gateway controller is greater than a predetermined amount.

4. A method as in claim 1, further comprising assigning a neighboring node to a separate gateway controller when a node of the plurality of nodes is receiving substantial radio frequency interference and metrics predict that the node cannot be reassigned to a separate gateway controller.

5. A method as in claim 1, wherein dynamically changing a portion of a mesh network into a star-cluster network further comprises instructing all but one node in the cluster of nodes to attenuate the output power of the all but one node in order to isolate the cluster of nodes to an island within the mesh network, wherein the cluster of nodes is comprised of at least three adjacent nodes.

6. A method as in claim 1, wherein dynamically changing a portion of a mesh network into a star-cluster network further comprises instructing all but one node in the cluster of nodes to attenuate the output power of the all but one node in order to isolate the cluster of nodes to an island within the mesh network, wherein the cluster of nodes is comprised of at least four nodes located in a junction box.

7. A method as in claim 1, further comprising dynamically changing a portion of the mesh network into a star-cluster network by instructing all but one node of each channel in a cluster of nodes to attenuate output power of the all but one node for each channel in order to minimize interference between adjacent nodes in the cluster of nodes.

8. A method as in claim 1, further comprising reducing radio frequency transmission power of an adjacent node when the radio frequency interference level of a node is greater than a predetermined amount.

9. A method as in claim 1, further comprising configuring the gateway controllers to transmit substantially non-interfering spread spectrum signals using orthogonal pseudorandom noise codes.

10. A method as in claim 9, further comprising enabling a gateway controller to dynamically assign a pseudorandom noise code to one or more nodes.

11. A method as in claim 10, further comprising assigning the pseudorandom noise code to a node receiving more than a predetermined amount of radio frequency interference.

12. A method as in claim 9, further comprising configuring the gateway controllers to dynamically change a portion of the mesh network into a star-cluster network by instructing all but one node of each pseudorandom noise code in a cluster of nodes to attenuate output power of the all but one node for each pseudorandom noise code in order to minimize interference between adjacent nodes in the cluster of nodes.

13. A method as in claim 1, further comprising configuring each gateway controller to collect information from each node that has been assigned to the gateway when a change occurs in the mesh network.

14. A method as in claim 13, further comprising enabling each gateway controller to gather at least one metric selected from the group consisting of a number of hops between a node and the gateway controller, a level of radio signal strength between the node and the gateway controller, addresses of one or more neighboring nodes of each node assigned to the gateway controller, whether each node is capable of roaming, a data rate at which each node is transmitting, how much bandwidth of each node is available for use, and an average amount of bandwidth that is being used for each node.

15. A method as in claim 1, further comprising locating an orphaned node by
configuring the orphaned node to change to a different channel or code to enable the orphaned node to communicate with different node neighbors or gateway controllers.

16. A method as in claim 1, further comprising configuring the gateway controllers to instruct selected nodes within the mesh network not to send data through a bandwidth limited node that would otherwise be assigned, but to use an alternative node instead based upon recorded metrics of neighboring nodes.

17. A system for distributing communications through a dense mesh network having a plurality of nodes coupled to one of at least two gateway controllers,
comprising:
a calculating means for calculating a node location of each node relative to other nodes in the mesh network;
an assigning means for assigning nodes to separate gateway controllers when the nodes are within a predetermined distance of each other;
a measuring means for measuring radio frequency interference levels between the plurality of nodes and changing a channel of nodes having levels greater than a predetermined amount; and
a means for dynamically changing a portion of the dense mesh network into a star-cluster network by instructing all but one node in a cluster of nodes to attenuate output power of the all but one node in order to reduce radio frequency interference between the nodes in the cluster of nodes within the mesh network, wherein the means for dynamically changing the portion of the dense mesh network into a star-cluster network is based on an interference measurement.

* * * * *